United States Patent
Bhanu et al.

(10) Patent No.: US 12,046,038 B2
(45) Date of Patent: Jul. 23, 2024

(54) SYSTEM AND METHOD FOR GENERATING VISUAL ANALYTICS AND PLAYER STATISTICS

(71) Applicant: The Regents of the University of California, Oakland, CA (US)

(72) Inventors: Bir Bhanu, Riverside, CA (US); Rajkumar Theagarajan, San Jose, CA (US); Federico Pala, Oakland, CA (US); Xiu Zhang, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/827,481

(22) Filed: Mar. 23, 2020

(65) Prior Publication Data
US 2020/0302181 A1 Sep. 24, 2020

Related U.S. Application Data

(60) Provisional application No. 62/822,497, filed on Mar. 22, 2019.

(51) Int. Cl.
*G06V 20/40* (2022.01)
*A63B 24/00* (2006.01)
*G06N 3/045* (2023.01)
*G06V 40/20* (2022.01)

(52) U.S. Cl.
CPC .......... *G06V 20/42* (2022.01); *A63B 24/0006* (2013.01); *G06N 3/045* (2023.01); *G06V 40/23* (2022.01)

(58) Field of Classification Search
CPC .......... G06K 9/00724; G06K 9/00342; G06N 3/0454
See application file for complete search history.

(56) References Cited

U.S. PATENT DOCUMENTS

| | | | | |
|---|---|---|---|---|
| 9,275,470 | B1* | 3/2016 | Forkosh | G06T 7/248 |
| 9,978,425 | B2* | 5/2018 | Kirk | G11B 27/11 |
| 10,489,656 | B2* | 11/2019 | Lee | G06K 9/4628 |
| 10,632,359 | B2* | 4/2020 | Spivak | A63B 71/0605 |
| 10,956,723 | B2* | 3/2021 | Marty | G06V 20/42 |
| 2008/0192116 | A1* | 8/2008 | Tamir | G06T 7/292 |
| | | | | 348/157 |
| 2009/0060321 | A1* | 3/2009 | Gillard | G06T 17/00 |
| | | | | 382/154 |
| 2010/0177969 | A1* | 7/2010 | Huang | G06T 7/11 |
| | | | | 382/224 |
| 2011/0268320 | A1* | 11/2011 | Huang | G06V 20/41 |
| | | | | 382/103 |

(Continued)

OTHER PUBLICATIONS

Radford et al. "Unsupervised representation learning with deep convolutional generative adversarial networks" arXiv preprint arXiv:1511.06434 (2015) (Year: 2015).*

*Primary Examiner* — Boubacar Abdou Tchoussou
(74) *Attorney, Agent, or Firm* — Ivan M. Posey, Esq.

(57) ABSTRACT

A system and method described herein is effective for generating automated visual analytics and player statistics for videos of sporting events. A dataset of videos is collected that comprises multiple teams. Training the networks on RGB and grayscale images affects the generalization ability of the network learned and augmenting more images using generative adversarial networks to the dataset helps further improves the performance.

12 Claims, 8 Drawing Sheets

(56) References Cited

U.S. PATENT DOCUMENTS

| | | | |
|---|---|---|---|
| 2016/0260015 A1* | 9/2016 | Lucey | G06F 3/0481 |
| 2016/0314818 A1* | 10/2016 | Kirk | G11B 27/10 |
| 2017/0333777 A1* | 11/2017 | Spivak | A63B 71/0605 |
| 2018/0322337 A1* | 11/2018 | Marty | G06T 7/20 |
| 2018/0336439 A1* | 11/2018 | Kliger | G06N 3/0472 |
| 2018/0336471 A1* | 11/2018 | Rezagholizadeh | G06N 3/08 |
| 2019/0087661 A1* | 3/2019 | Lee | G06Q 50/00 |
| 2019/0122120 A1* | 4/2019 | Wu | G06N 3/0454 |
| 2019/0266407 A1* | 8/2019 | Gupta | G06V 20/42 |
| 2020/0218901 A1* | 7/2020 | Elder | G06V 10/82 |
| 2021/0232871 A1* | 7/2021 | Iancu | G06K 9/00805 |

\* cited by examiner

Figure 5A (a) Localization without grid based resizing

Figure 5B (b) Localization with grid based resizing

SYSTEM AND METHOD FOR GENERATING VISUAL ANALYTICS AND PLAYER STATISTICS

RELATED APPLICATION INFORMATION

This application claims priority from U.S. Provisional Application Ser. No. 62/822,497, entitled "Generating Visual Analytics and Player Statistics for Soccer", filed Mar. 22, 2019, the entirety of which is hereby incorporated by reference.

FIELD OF THE INVENTION

The invention relates to a system and method for generating visual analytics and player statistics. More specifically, the system and method is used for talent identification, analysis and selection of athletes.

BACKGROUND OF THE INVENTION

The world of sports intrinsically involves fast and complex events that are difficult for coaches, trainers and players to analyze, and also for audiences to follow. In sports, talent identification and selection are imperative for the development of future elite level performers. Current scenarios involve word-of-mouth, coaches and recruiters scouring through hours of videos and, many times, manual annotation of these videos.

Computer vision plays a key role in the world of sports and the best-known current application areas are in sports analysis for broadcast. Computer vision is also used behind-the-scenes, in areas such as training and coaching, and providing help for the referee during a game. To date most of the applications for providing sports analysis and player training from video are carried out manually. This requires lots of hours spent watching videos and annotating them.

According to a survey conducted by CNS News and Statista, soccer is the number one game played by most students. It is estimated that a total of 838,573 students (450,234 boys and 338,339 girls) across the United States played soccer for their school for the year 2016/17. From this, only 9% of the boys and 11.90% of the girls receive scholarship to go to college, which makes it extremely competitive.

Identification of the next generation of sports stars is an important part of a coach's roles and responsibilities. Talent identification has traditionally been based on viewing athletes in a trial game or training session environment, whereby the players aim to impress coaches. This approach to talent selection or recruitment is not informed by scientific evidence, but rather a coach's subjective preconceived notion of the ideal player, which may result in repetitive misjudgments and limited consistency. Therefore, it is of interest to further investigate this area for talent identification and help coaches and recruiters to select potentially talented players more easily and without bias.

The central premise of talent identification and recruitment is to identify and select the most promising young athletes with the potential to excel and become a successful professional senior athlete. In team-based sports, such as soccer, talent identification is a complex process due to the different qualities associated with performance, which includes personal and tactical attributes. Personal attributes refer to how well the player is able to keep the ball possession with him/herself and tactical attributes refer to how successful the player is in passing the ball to the teammates and adapting to different strategies.

Various techniques that have been used in commercially-available systems today. The main applications for sports visual analytics are camera calibration, detecting and tracking players as well as the ball.

Camera calibration is essential for tracking players on the field. The majority of the commercially available systems today use a multi-camera approach for tracking players and the ball. A common approach for multi-camera calibration is to use known positions in the scene. This avoids the need for specially-equipped lenses and mounts. In sports such as soccer where there are prominent line markings on the pitch, a line-based calibration is often used. One system used the Hough transform to detect the straight lines in the soccer field. The initial pose of the camera is used and peaks in Hough space to establish correspondence with the lines in the scene and hence calibrate the camera. Homayounfar et al. computed the transformation between a broadcast image of a sports field and the 3D geometric model of that field. That system first detected the vanishing point of the field which helped in reducing the total number of degrees of freedom to be estimated. Next, it performed semantic segmentation to segment the grass field from the field lines and estimated the homography matrix by formulating it as energy minimization in a Markov random field.

After camera calibration, detecting the position of players at a given moment of time and tracking them is the next step for generating useful visual analytics and player statistics, which can be extremely challenging. In most sports, especially in soccer the players appear to be very small from the camera's perspective causing a lot of occlusions and since they wear similar colored jerseys it makes it very difficult to identify players. The most common way to distinguish players is based on the color information of their jerseys, but this does not help to discriminate the players individually. Bertini et al. used close-up camera shots to identify players individually by the integration of face and jersey numbers. The drawback with this approach is that it requires a high-resolution camera setup and resources which may not be available. Moreover, the camera is constantly being panned and zoomed depending on where the action is happening on the field focusing on only a few players which could lead to some players not being detected and, thus, not being able to generate proper statistics.

To address this task there are two commonly used methods: (a) extracting visual features (color, texture, motion vectors as cues and then applying deterministic methods such as support vector machines (SVM), (b) considering player identification and tracking as a data association problem, detecting players in each frame, obtain their tracklets and associate them in contiguous frames. Both of these approaches have problems when players are dense in one small area causing too many occlusions.

Lie et al. approached this task by tracking the players using a Markov Chain Monte Carlo (MCMC) data association. Sachiko and Hideo used a joint probability data association filter to associate the players location in the previous frames to the players location in the current frame. Instead of relying just on visual cues, Wei-Lwun et al. detected players over multiple frames and used their short-term motion patterns to estimate their homography. Unlike most approaches that relied on matching robust feature points, that system tries to match edge points between players in continuous frames along with their motion patterns.

To date, the only system developed for generating visual analytics for soccer is the system developed by Stensland et al. That systems uses a real-time prototype (Bagadus) for sports analytics application using soccer as a case study which is currently installed at the Alfheim Stadium in Norway. The system integrates a sensor system which uses global positioning and radio based systems for tracking the players, a manual soccer analytics annotation system, and a video processing system with a camera array. Although, the prototype integrates and creates an interactive system for sports visual analytics, the process is not automated and requires hours of videos to be analyzed by scouts to find the most promising talents.

Thus, there is a need for a system that solves the shortcomings of the systems described above.

SUMMARY OF THE INVENTION

To solve shortcomings of the systems and methods described above, one embodiment of the a system described herein automates the talent identification problem by generating visual analytics and player statistics from a video using algorithms and deep learning techniques for computer vision. The system and method utilizes the following features:

- A method to automatically generate visual analytics and player statistics for soccer matches from videos.
- Dynamic identification of players controlling the ball using convolutional neural networks.
- Strategy to train generative adversarial networks (GANs) that augment the datasets to improve the performance of the system.
- Extensive experimentation on a dataset collected from different soccer games.
- Trained networks on team dependent and team independent datasets to show the generalizability of the system during different scenarios of the game.

DETAILED DESCRIPTION OF THE PREFERRED EMBODIMENTS

Figure 1:
FIG. 1 is a diagram illustrating examples of data showing players with a ball.

For the purpose of illustrating the invention, there is shown in the accompanying drawings several embodiments of the invention. However, it should be understood by those of ordinary skill in the art that the invention is not limited to the precise arrangements and instrumentalities shown therein and described below.

The system and method for generating visual analytics and player statistics is disclosed in accordance with preferred embodiments of the present invention is illustrated in FIGS. 1-10 wherein like reference numerals are used throughout to designate like elements.

Figure 2:
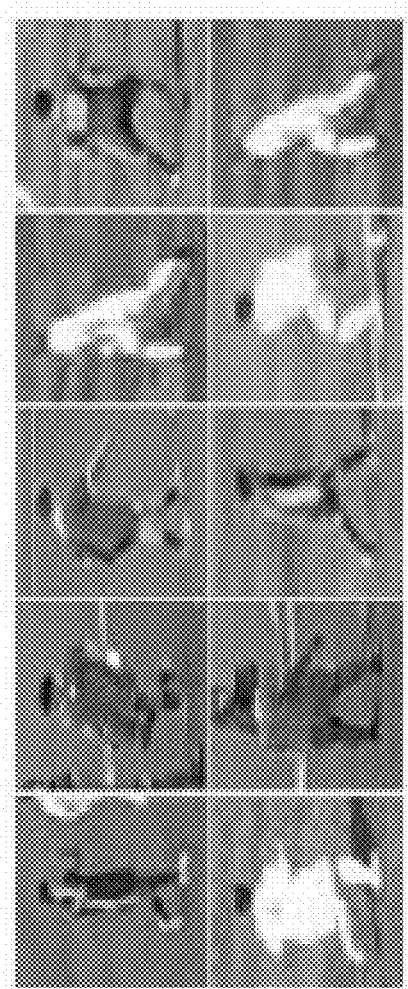
FIG. 2 is a diagram illustrating examples of data showing players without a ball.
Figure 3:
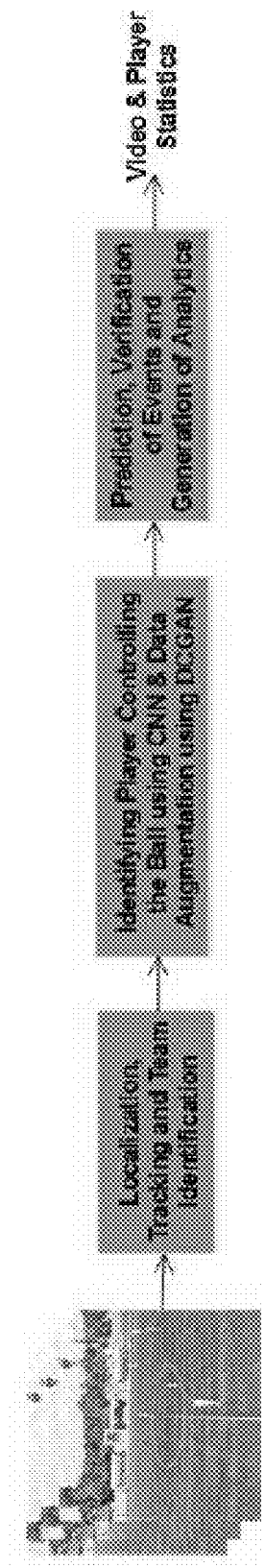
FIG. 3 is a flow diagram that illustrates the overall architecture of the system and method according to one embodiment.

In one experimental embodiment, a dataset was collected that consists of 49,952 images which are annotated into two classes, namely: players with the ball (12,586 images) and players without the ball (37,366 images). FIG. 1 shows examples of players with the ball and FIG. 2 shows examples of players without the ball, respectively, from the dataset. In one embodiment, the system detects the soccer players in the incoming video stream using YOLO9000—real-time object detection descried by Redmon et al. J. Redmon and A. Farhadi. Yolo9000: Better, faster, stronger. *arXiv preprint arXiv:* 1612.08242, 2016. The framework of YOLO9000 comprises a single convolutional neural network (CNN) that predicts multiple bounding boxes for an image along with the respective class probabilities for each bounding box. YOLO9000 divides the input image into 11×11 grids and for each grid, the CNN predicts a set of bounding boxes along with the conditional probability for each class. In one embodiment, the network may be trained on the PASCAL VOC 2007 dataset described in M. Everingham, L. Van Gool, C. K. Williams, J. Winn, and A. Zisserman, "The pascal visual object classes (voc) challenge", *International Journal of Computer Vision,* 88(2): 303-338, 2010, the COCO 2016 keypoints challenge dataset described in J. Liu, X. Tong, W. Li, T. Wang, Y. Zhang, and H. Wang. "Automatic player detection, labeling and tracking in broadcast soccer video", *Pattern Recognition Letters,* 30(2):103-113, 2009, and Imagenet described in O. Russakovsky, J. Deng, H. Su, J. Krause, S. Satheesh, S. Ma, Z. Huang, A. Karpathy, A. Khosla, M. Bernstein, et al., "Imagenet large scale visual recognition challenge", *International Journal of Computer Vision,* 115(3):211-252, 2015. All of these datasets have very diverse images for the class People which also includes sports players. The images in these datasets have different scale variations, and occlusions which is similar to the scenario on a soccer field. For a given frame, the bounding boxes belonging to the class People with probability greater than a threshold are considered to be the locations of the soccer players for that frame. After detecting the soccer players in consecutive frames, in one embodiment, the system may use the DeepSort tracking method described by Wojke et al. N. Wojke, A. Bewley, and D. Paulus, "Simple online and realtime tracking with a deep association metric", *arXiv preprint arXiv:* 1703.07402, 2017, to track the soccer players over consecutive frames and formulate the association of the soccer players as a re-identification problem. The method involves training a YOLO9000 based CNN. The CNN detects the players in each frame and extracts a feature set for each player. The authors also concatenate an 8-dimensional state-space feature set (u, v, γ, h, u', v', γ', h') where, (u, v) is the image coordinate of the center of the bounding box, γ is the aspect ratio, h is the height of the bounding box and (u', v', γ', h') are their respective velocities in the image coordinate. The association of the soccer players in the next frame is done by using the visual appearance feature from the CNN and 8-dimension state-space motion feature as input to a Hungarian algorithm.

Soccer matches, for example, involve two teams wearing different colored jerseys. Each of these jerseys is visually very different from the other, hence, one embodiment may use a histogram-based matching method for identifying the team of a given player.

Figure 4:
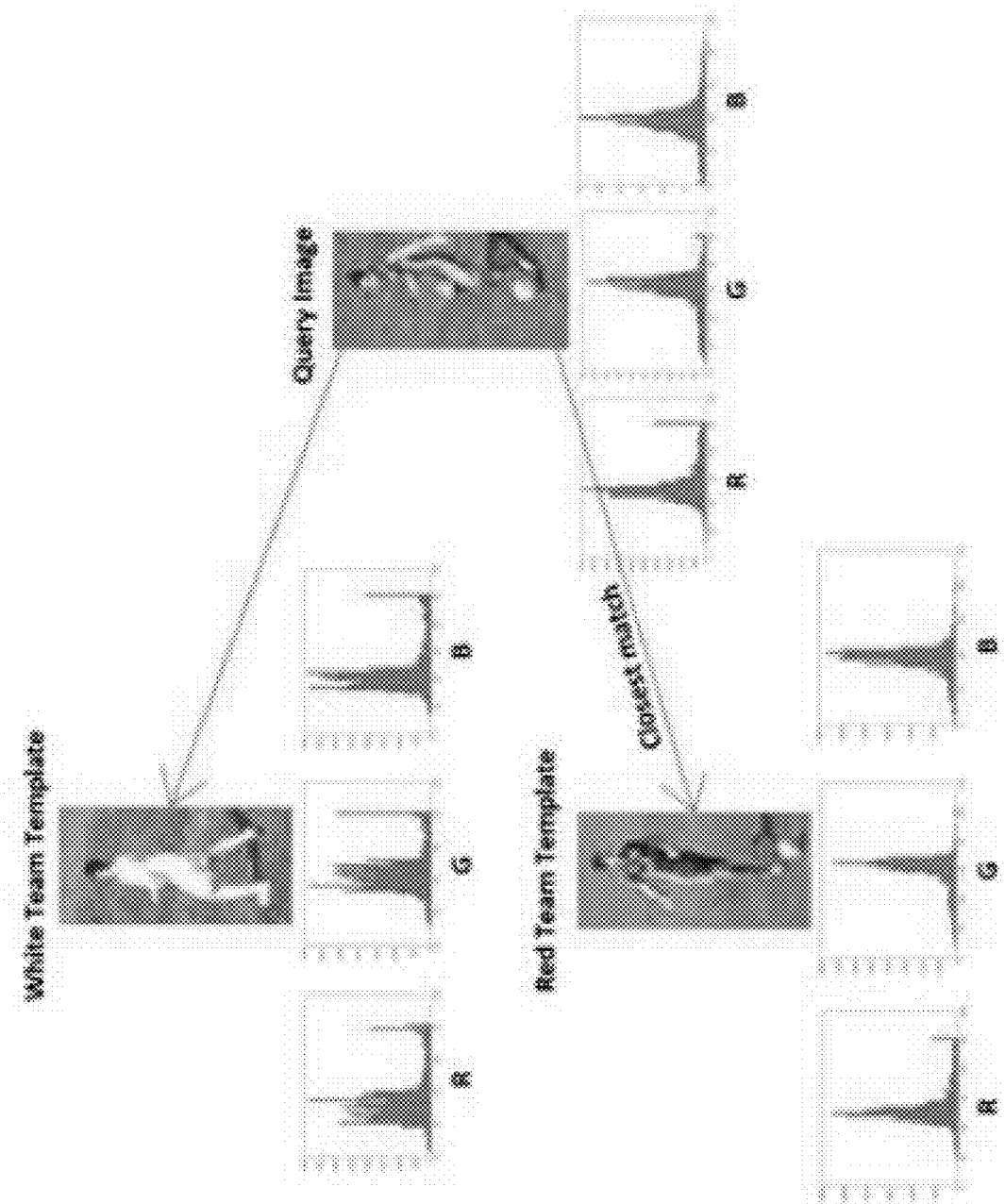
FIG. 4 is a flow diagram that illustrates the process of histogram matching for team identification.
Figure 5:
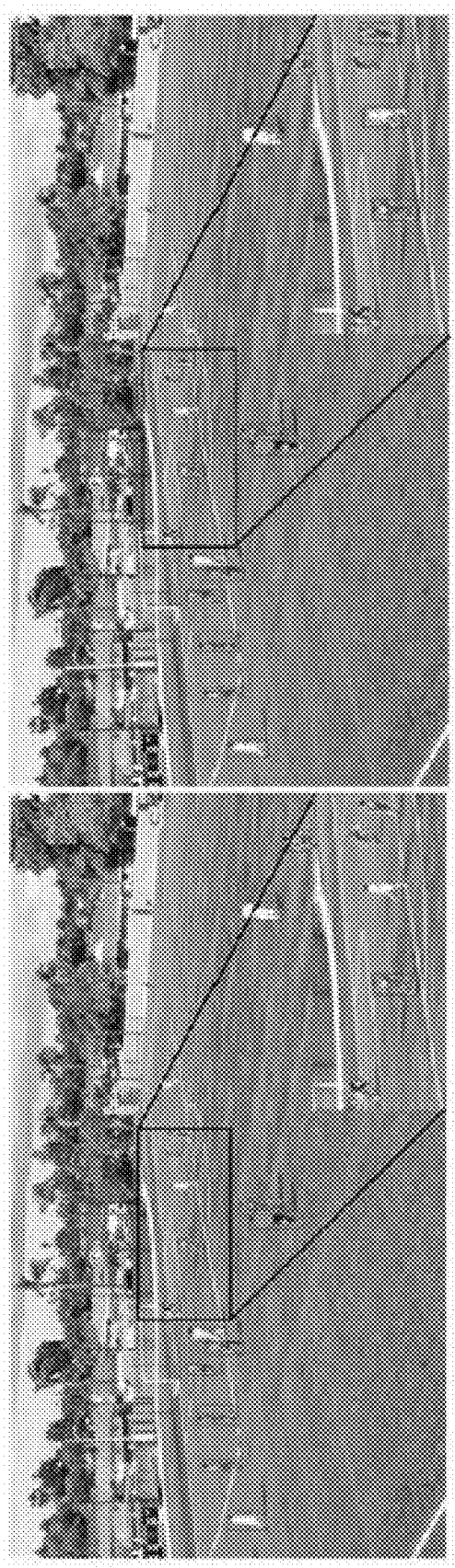
FIG. 5(a) is a graphic that illustrates an example of soccer player detection without grid-based resizing.
FIG. 5(b) is a graphic that illustrates an example of soccer player detection with grid-based resizing.

Before processing the video, the region-of-interest (ROI) of 10 random players is cropped from each team and their corresponding goal keepers and use them as a reference template. Next, after detecting the soccer players for a given frame, the ROI of each soccer player is cropped and its 64-bin color histogram is computed to be compared with each of the templates. The team with the closest average Euclidean distance is selected as the team of the player. FIG. 4 shows the process of histogram matching for team identification. In alternative embodiments, the system may replace this approach with a method that does not require any templates for matching.

In one embodiment, to generate player statistics and visual analytics for soccer, the system identifies the player who is in control of the ball at any given point of time. To achieve this, convolutional neural networks (CNN) trained to classify a given ROI of the soccer player as either "a player with the ball" or "player without the ball" is used.

Experiments with baseline customized networks and fine-tuned state-of-the-art networks, namely VGG-16, VGG-19, ResNet18, ResNet34 and AlexNet, were conducted. Each network was compared and observed with the features they learned to find the network that gives the best classification accuracy and generalizability. For all the experiments, the CNN's were evaluated based on the mean accuracy between the two classes.

In order to train the state-of-the-art networks, all the images were resized to be of size 224×224. A mini batch size of 128 is selected and during every epoch, the training data is randomly shuffled and randomly horizontal-flipped. All the state-of-the-art networks were pre-trained on the ImageNet dataset previously mentioned. Since the ImageNet dataset has 1000 classes, the last fully connected layer from 1000 was modified to two classes.

Customized networks were designated to determine if preserving the aspect ratio helps in improving the classification performance. The average aspect ratio of the images in the dataset used in test was found to be 0.642. To keep all the images of a uniform size, the images may be resized to 160×100. Table 1 and Table 2 show the architecture of the networks according to one embodiment. In Table 1 and Table 2, conv(x, y, z) represents convolution(kernel size=x, stride=y, padding=z). Furthermore, the weights for SoccerNet 1 and SoccerNet 2 were initialized with uniform Xavier distribution as described in X. Glorot and Y. Bengio, "Understanding the difficulty of training deep feedforward neural networks", *Proceedings of the* 13*th International Conference on Artificial Intelligence and Statistics*, pages 249-256, 2010.

A random parameter search was performed for all the networks to obtain the best learning rate, momentum and weight decay. The networks were optimized using the stochastic gradient descent algorithm with weighted cross entropy loss. Since the dataset is unbalanced, the complementary a-priori probability of each class was used as weights in the loss function.

$$C_i = 1 - X_{ci}/X \quad (1)$$

$X_{ci}$ is the total number of images belonging to class $C_i$ and X is the total number of images for all classes.

The random parameter search was done by training and validating a given network with random values within a range for each parameter for 5 epochs, and the combination of parameters that resulted in the highest mean accuracy were chosen as the best parameters for that given network. Table 3 shows the best parameters that were obtained for training all the networks mentioned above in one embodiment.

TABLE 1

Architecture of SoccerNet 1.

| Input dim. | Output dim. | No. of Feature maps | Layer |
|---|---|---|---|
| 160 × 100 | 80 × 50 | 64 | Conv(5, 2, 2) |
| 80 × 50 | 40 × 25 | 128 | Conv(5, 2, 2) |
| 40 × 25 | 20 × 12 | 256 | Conv(5, 2, 2) |
| 20 × 12 | 10 × 6 | 512 | Conv(5, 2, 2) |
| 10 × 6 | 5 × 3 | 512 | Conv(5, 2, 2) |
| 7,680 × 1 | 2 classes | — | FC layer |

TABLE 2

Architecture of SoccerNet 2.

| Input dim. | Output dim. | No. of Feature maps | Layer |
|---|---|---|---|
| 160 × 100 | 80 × 50 | 128 | Conv(7, 2, 3) |
| 80 × 50 | 40 × 25 | 256 | Conv(3, 2, 1) |
| 40 × 25 | 20 × 12 | 512 | Conv(5, 2, 2) |
| 20 × 12 | 10 × 6 | 1024 | Conv(3, 2, 1) |
| 10 × 6 | 5 × 3 | 1024 | Conv(3, 2, 1) |
| 15,360 × 1 | 2 classes | — | FC layer |

TABLE 3

Best parameters for fine tuning the networks.

| Network | Learning rate | Momentum | Weight decay |
|---|---|---|---|
| SoccerNet 1 | $2 \times 10^{-2}$ | 0.6 | $1 \times 10^{-3}$ |
| SoccerNet 2 | $7.5 \times 10^{-2}$ | 0.8 | $1 \times 10^{-3}$ |
| VGG-16 | $2.5 \times 10^{-3}$ | 0.6 | $1 \times 10^{-4}$ |
| VGG-19 | $4 \times 10^{-3}$ | 0.8 | $1 \times 10^{-4}$ |
| ResNet18 | $6 \times 10^{-3}$ | 0.9 | $1 \times 10^{-4}$ |
| ResNet34 | $6.5 \times 10^{-3}$ | 0.9 | $5 \times 10^{-4}$ |
| AlexNet | $3 \times 10^{-3}$ | 0.7 | $1 \times 10^{-4}$ |

Data augmentation may be performed on the dataset. The purpose of data augmentation is to determine if adding more variability to the training dataset helps to improve the performance of the network.

In one embodiment, a deep convolutional generative adversarial network (DCGAN) was trained. It comprises two deep convolutional neural networks, a generator G and a discriminator D trained against each other. The generator takes a random noise vector, z, and returns an image, Xgen=G(z). The discriminator takes a real or a generated image, and outputs a probability distribution P(S|X)=D(X) over the two image sources. The discriminator is trained to maximize the log-likelihood of assigning the correct source while G tries to minimize it. The optimization function V is given by:

$$\min_G \max_D V(D, G) = \mathbb{E}_{x \sim p_{data}(x)}[\log D(x)] + \mathbb{E}_{x \sim p_z(z)}[\log(1 - D(G(z)))]. \quad (2)$$

The objective is that the two networks converge to the Nash equilibrium so that D is maximally confused and G generates samples that resemble the training data (in our case players with the ball). The system may use the method described in A. Radford, L. Metz, and S. Chintala, "Unsupervised representation learning with deep convolutional generative adversarial networks", *arXiv preprint arXiv: 1511.06434*, 2015, for designing a stable architecture for generating images of better quality. That system suggests replacing pooling layers with convolutional layers for both the generator and discriminator, using batch normalization after convolutional layers, ReLU activation in the generator and Leaky ReLU in the discriminator. Based on these suggestions, one embodiment uses a generator and discriminator network to learn to generate images that resemble players with the ball.

Next is described the process of generating the visual analytics and player statistics. After tracking a soccer player, determining his/her team and identifying the player controlling the ball, the system may detect if the player controlling the ball changes over successive frames. If so, the system may observe if the new player controlling the ball belongs to the same team. If the new player belongs to the same team, the system may define it as a successful pass. Otherwise it is a failed pass.

Based on this logic the system can generate visual analytics describing which player currently controls the ball and when a pass is made. The system may also keep track of the duration each player controls the ball (ball possession) and the total number of successful passes each player has made, thus, generating player's performance statistics.

When two or more players are very close to each other, it becomes difficult for the network to identify which player controls the ball. To solve this, the system may use a low-pass filter to help smooth the transition between the player controlling the ball. By doing so, some false alarms due to the misclassification of player with the ball may also be avoided.

During experimentation, the creators of the system described herein trained and evaluated the system on datasets collected from different soccer matches. The overall framework of the system, in one embodiment, is implemented on PyTorch, available from www.pytorch.org with 4 TITAN X GPU's with 7 TFlops of single precision, 336.5 GB/s of memory and 12 GB of random access memory (RAM) memory per board.

A dataset was collected from three different soccer matches. The matches played by the teams were recorded using a single Canon XA10 video camera. The camera was installed at a height of 15 feet and 20 feet away from the horizontal baseline of the soccer field. In order to collect high resolution and good quality images with enough pixels on a player's body, the camera operator was allowed to pan and zoom depending on where the action is happening on the soccer field.

The dataset used in the test consisted of 49,952 images, and it is annotated into two classes namely: players with the ball (12,586 images) and players without the ball (37,366 images). The dataset was annotated by five experts and the final label for a given image is obtained by taking the majority vote of the five annotators. The dataset was comprised of three teams whose jersey colors are white, red and blue. Out of the 49,952 images, the white team constitutes 27.95% of the dataset (13,959 images), the red team constitutes 34.82% of the dataset (17,392 images) and the blue team constitutes 37.24% of the dataset (18,600 images). Within the two classes, the white, red and blue team constitute 24.81%, 16.46% and 58.72% for players with the ball and 29%, 41% and 30% for players without the ball, respectively. Table 4 shows the data distribution of the three teams for the two classes.

TABLE 4

Data distribution of the three teams for the two classes.

| Class | White Team | Red Team | Blue Team |
|---|---|---|---|
| Player With Ball | 3,123 | 2,072 | 7,390 |
| Player Without Ball | 10,386 | 15,320 | 11,210 |

Clearly from Table 4, it can be seen that the dataset is highly unbalanced which makes it challenging. The reason for this is that, for every frame of the video only one person can control the ball, which leaves 21 other players without the ball. But as the camera is being panned and zoomed, not all 22 players are present in a single frame all the time, resulting in 25.2% of the data constituting for the class "players with the ball" and 74.8% of the data constituting for the class "players without the ball".

Furthermore, five test videos were used exclusively for evaluating tracking, team identification and prediction of game analytics. The videos were categorized based on their complexity as easy, moderate and hard. In the easy complexity case, there are only 4 to 5 players spread wide apart usually in the defense zone and do not cause any occlusions. In the Moderate complexity case there are 6 to 10 people in the mid-field region causing partial occlusion to the surrounding players and the ball. The hard complexity case is when there are more than 10 players gathered within a small area on the field causing a lot of occlusions. This usually occurs when a player tries to attempt a shot at the goal, making it very difficult to generate visual analytics.

One embodiment of the system was tested with two state-of-the-art CNN's, namely YOLO9000 (Better, faster, stronger, *arXiv preprint arXiv:* 1612.08242, 2016) and OpenPose (Z. Cao, T. Simon, S.-E. Wei, and Y. Sheikh, "Realtime multiperson 2d pose estimation using part affinity fields", *Proceedings IEEE Conference on Computer Vision and Pattern Recognition,* 2017) for the localization of soccer players. Both of the networks on five exclusive test videos were evaluated (mentioned above) based on their average intersection over union (IoU). The YOLO9000 network achieved an IoU of 84.57% and the OpenPose network achieved an IoU of 69.84%. Both of the networks were able to detect players that were closer to the camera and as the players moved in the opposite direction the camera was facing, the number of pixels on player's body started to reduce making it difficult to detect them.

To solve this, the system applied a grid-based localization approach, where it divided the input frames of size 1920× 1080 into four equal sized cells. Each cell is of size 960×540 preserving the aspect ratio, and it resized each of the cells individually to 1920×1080. Next, localization was performed individually on these four cells and the results concatenated into a single video frame. By doing this, the system achieved an IoU of 73.27% and 85.21% using the OpenPose network and YOLO9000, respectively. FIGS. 5(a) and 5(b) show examples of soccer player detection without and with grid-based resizing, respectively. It can be observed that in FIG. 5(b) two of the soccer players that are farther away from the camera and the goalkeeper are detected successfully after doing the grid-based resizing (see the magnified sub-image). The system still encountered some problems after doing the grid-based resizing because some players who were close to the opposite horizontal baseline from the camera had too few pixels on their body. Moreover, resizing them increased the pixel distortion and made them unrecognizable.

The tracking algorithm on five test videos were evaluated. The system achieved an average accuracy of 76.54%±6.37%. The errors in tracking occur in difficult cases when two or more players overlap with each other, which causes the detector (YOLO9000) to detect them as a single player. This mostly occurs only when the striker enters the opposition area to attempt a shot at the goal. Even though multiple players were detected as one player, after these players separated from each other and were detected correctly, the tracking algorithm was still able to distinguish the players as they were before the overlapping occurred.

The histogram matching approach was evaluated on five test videos that were used for evaluating the detection and tracking algorithm. The system achieved an average accuracy of 92.57%±2.92%. While calculating the accuracy, instances when multiple players overlapped each other were ignored. There were errors when a player is close to the opposite horizontal baseline away from the camera. The reason for this is that, the players have very few pixels on their body which causes errors while matching their histograms with the templates.

The results obtained using different CNN's as described above will now be discussed. Also discussed is how the color of different team jerseys affects the performance of these networks. In experiments, the testing procedure randomly selected 75% of the data in each class as training data, 10% of the data for validation and 15% of the data for testing. The validation data was used to obtain the best parameters for each network as described above.

In order to observe how the color of the team jersey affects the networks, annotated were a new set of images that involves soccer players wearing black colored jerseys. These images were not used for training the network and were added exclusively to the testing dataset. Table 5. shows the summary of the data distribution for the training, validation and testing dataset.

TABLE 5

Data distribution for training, validation and testing.

| Datset | Player without ball | Player without ball |
|---|---|---|
| Training set 75% | 9,440 | 2,802 |
| Validation set 10% | 1,258 | 3,736 |
| Testing set 15% + black jersey | 1,888 + 502 | 5,606 + 3,733 |

All the individual networks in three different settings were evaluated, namely 15% team dependent, 5% team dependent and team independent. In the 15% team dependent setting, the testing process used 75% of the original dataset (red, white and blue jersey) for training. The testing process used 15% of the original dataset and the black jersey for testing as shown in Table. 5. In the 5% team dependent setting we used 85% of original dataset for training. The testing process used 5% of the original dataset and the black jersey for testing. Finally, for the team independent setting, the testing process used 90% of the original dataset for training and the black jersey for testing.

Figure 6:
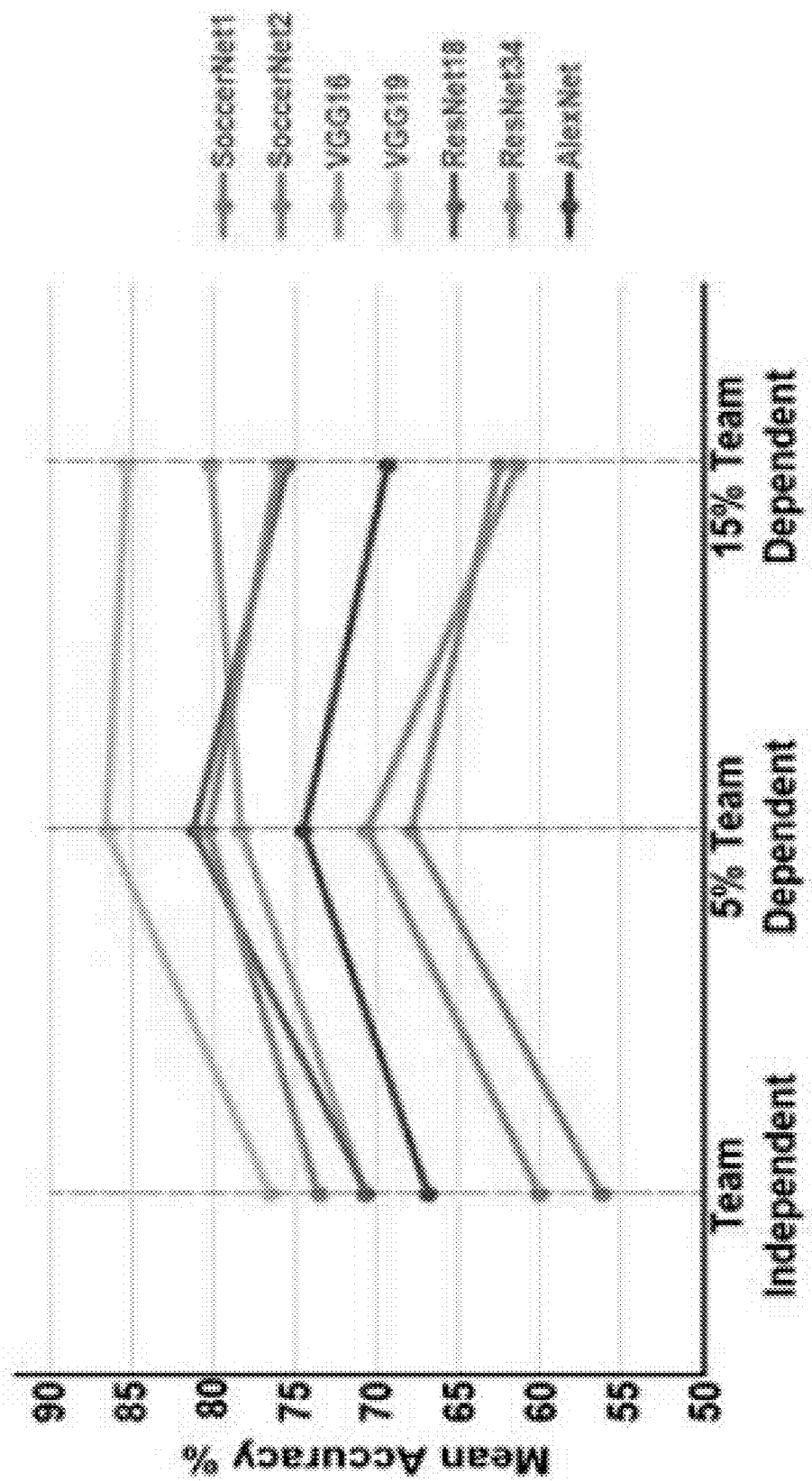
FIG. 6 is a graph showing the mean accuracy obtained using the individual networks for the team dependent and team independent setting.

For a comparison of different CNN architectures, Table 6 and FIG. 6 show the mean accuracy obtained using the individual networks for the team dependent and team independent setting.

TABLE 6.

Mean accuracy of all networks for the 3 settings.

| Network | 15% team Dependent | 5% Team Dependent | Team in dependent |
|---|---|---|---|
| SoccerNet 1 | 62.46% | 67.81% | 56.23% |
| SoccerNet 2 | 61.37% | 70.59% | 59.98% |
| VGG-16 | 80.21% | 78.34% | 70.71% |
| VGG-19 | 85.37% | 86.59% | 76.48% |
| ResNet18 | 75.48% | 81.23% | 70.62% |
| ResNet34 | 76.02% | 80.34% | 73.59% |
| AlexNet | 69.32% | 74.53% | 66.82% |

From Table 6 and FIG. 6, it is observed that the Visual Geometry Group-19 network (VGG-19) achieved the best performance for all the three settings. The mean accuracy for all the networks in the team independent setting was less compared to their respective team dependent settings. This indicates that, apart from learning the representation of a soccer ball, the convolutional filters are also storing some color information of the player jersey.

Figure 7:
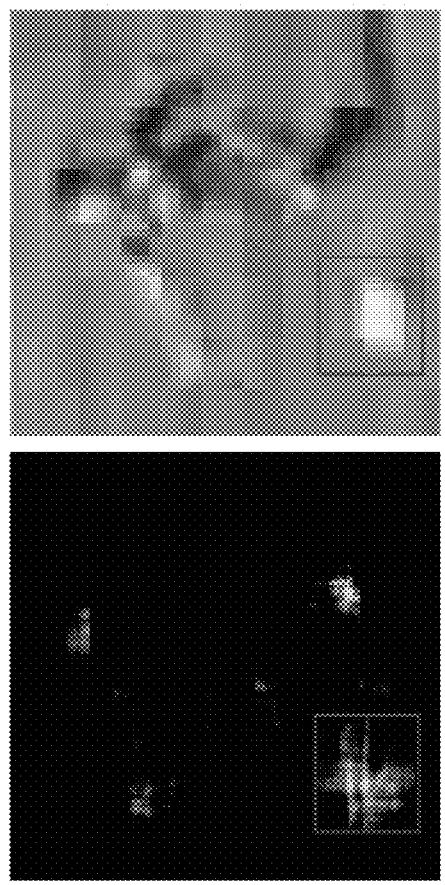
FIG. 7 is a graphic that shows the visualization of the probability score map for VGG-19, when part of the image is hidden by a sliding square window of size 64×64.

FIG. 7 shows the visualization of the probability score map for VGG-19, when part of the image is hidden by a sliding square window of size 64×64. In FIG. 7, the image on the left is probability score map for the class "player with the ball". The brightness of the pixels in the probability score map indicate how strong of an indicator the corresponding pixel in the image is for detecting if the player has the ball.

The system was further tested to check if using grayscale images improves the performance for the team independent setting. To achieve this, a random parameter search for VGG-16 and VGG-19 was performed to determine the best parameters for training the network with grayscale images. The test used the team independent setting with 90% of the original dataset for training and the black jersey team as the testing set (mentioned above). VGG-16 and VGG-19 achieved mean accuracy of 67.36% and 70.24% respectively.

Figure 8:
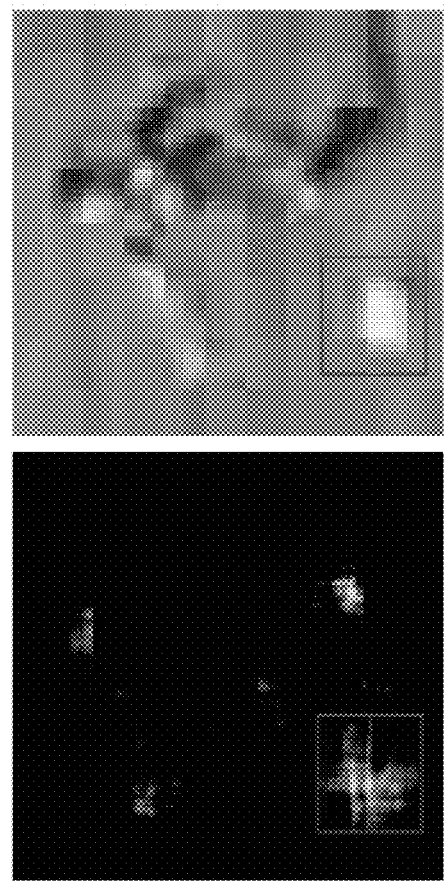
FIG. 8 is a graphic that shows the visualization of the probability score map for VGG-19 for grayscale images.

FIG. 8 shows the visualization of the probability score map for VGG-19 for grayscale images. In order to obtain the grayscale images, the RGB images were converted to HSV and the V plane was used as the grayscale image. The mean accuracy achieved using the gray scale images was less compared to the mean accuracy achieved with the RGB images. The reason for this is that when we convert the image to gray scale, the image loses some of its discriminative properties (white color of the ball) making it difficult for the network to generalize. In FIG. 8, it can be observed that, apart from the bright pixels corresponding to the ball, there are some very bright pixels that correspond to the color of the player's jersey. This indicates that the image is not very discriminative and the network is not generalizing well.

Next described is how augmenting the dataset affects the accuracy of VGG-16 and VGG-19 networks. The test used the dataset consisting of 12,586 images of players with the ball to train the DCGAN model. The generator was designed to take as input a 100×1 dimensional noise vector randomly sampled from a uniform distribution. The output of the generator is a RGB image of size 128×128. The discriminator was designed to take as input a RGB image of size 128×128 and predict if the image is real or generated. The learning rate for the generator and discriminator are $10^{-4}$ and $10^{-5}$, respectively, with mini batch size 32 and the weights of the generator are updated after every two mini batches. Both the generator and discriminator were optimized using the Adam algorithm and binary cross entropy loss function as described in A. Radford, L. Metz, and S. Chintala, "Unsupervised representation learning with deep convolutional generative adversarial networks", *arXiv preprint arXiv:* 1511.06434, 2015.

Figure 9:
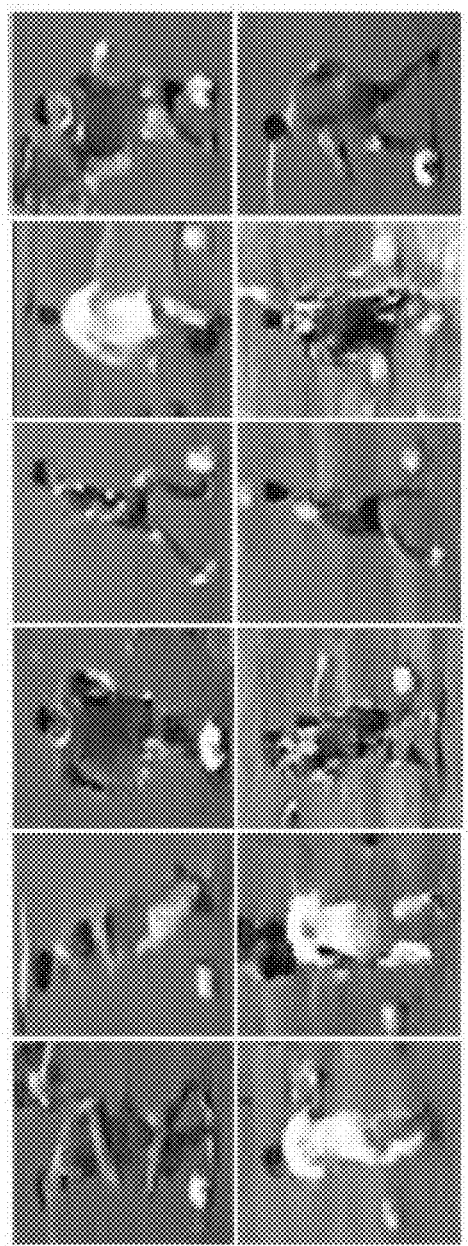
FIG. 9 is a graphic illustrating examples of generated images of players with the ball.

After training the deep convolutional generative adversarial network (DCGAN), we observed that the model was able to learn the representation of a soccer player but was not able to completely learn the presence of the soccer ball. To overcome this, after partially training the DCGAN (generator is able to generate some reasonable images), we passed the generated images to the already trained VGG-19 network to classify them. Based on the output from the VGG-19, the weights of the generator network are updated again. If the image generated is a player without the ball then the generator is penalized more, thus helping it to learn the correct representation of player with the ball. FIG. 9 shows some of the generated images.

Next, generated were 20,000 images of players with the ball and augmented it to our training dataset. We then trained the VGG-16 and VGG-19 networks were trained and evaluated with the team independent setting (mentioned above). VGG-16 and VGG-19 achieved a mean accuracy of 72.13% and 79.54%, respectively. Comparing the results of the team dependent setting from Table 6 for VGG-16 and VGG-19, it is determined that augmenting the dataset helped improve the accuracy of the respective networks. Thus, adding more variability helps improve the performance of the network.

The accuracy of the generated visual analytics on the five test case videos of varying complexities were evaluated (easy, moderate and hard as mentioned above). In the easy complexity case the proposed system was able to predict the visual analytics (i.e., which player controls the ball and when a pass is made) with accuracy of 84.73%. We achieved an accuracy of 79.82% for the moderate complexity and accuracy of 67.28% for the hard complexity cases.

In the hard complexity case, since the players are too close to each other causing occlusions, it is difficult for the network to identify which player is controlling the ball and leads to wrong visual analytics. This can be solved by identifying the player who controls the ball just before he/she enters the opposition's zone and since he/she is attempting a shot at the goal, he/she is not going to pass the ball. Thus, visual analytics processing can be paused for that duration and wait till the event is over to predict if the shot at the goal was successful.

In summary, a system and method described herein is effective for generating automated visual analytics and player statistics for soccer videos. A new dataset is collected that comprises multiple teams. Performed was an exhaustive evaluation on the dataset with team dependent and team independent settings and it was determined how these settings affect the performance of the networks. It was determined how training the networks on RGB and grayscale images affects the generalization ability of the network learned and how augmenting more images using generative adversarial networks to the dataset helps further to improve the performance. Also shown is how different scenarios of the soccer game affects the performance of the system and how it can be overcome. Other embodiments include systems tested by collecting more data with players wearing different jerseys, finding more events of interest to improve the visual analytics and generating a more comprehensive statistics for the players.

Figure 10:
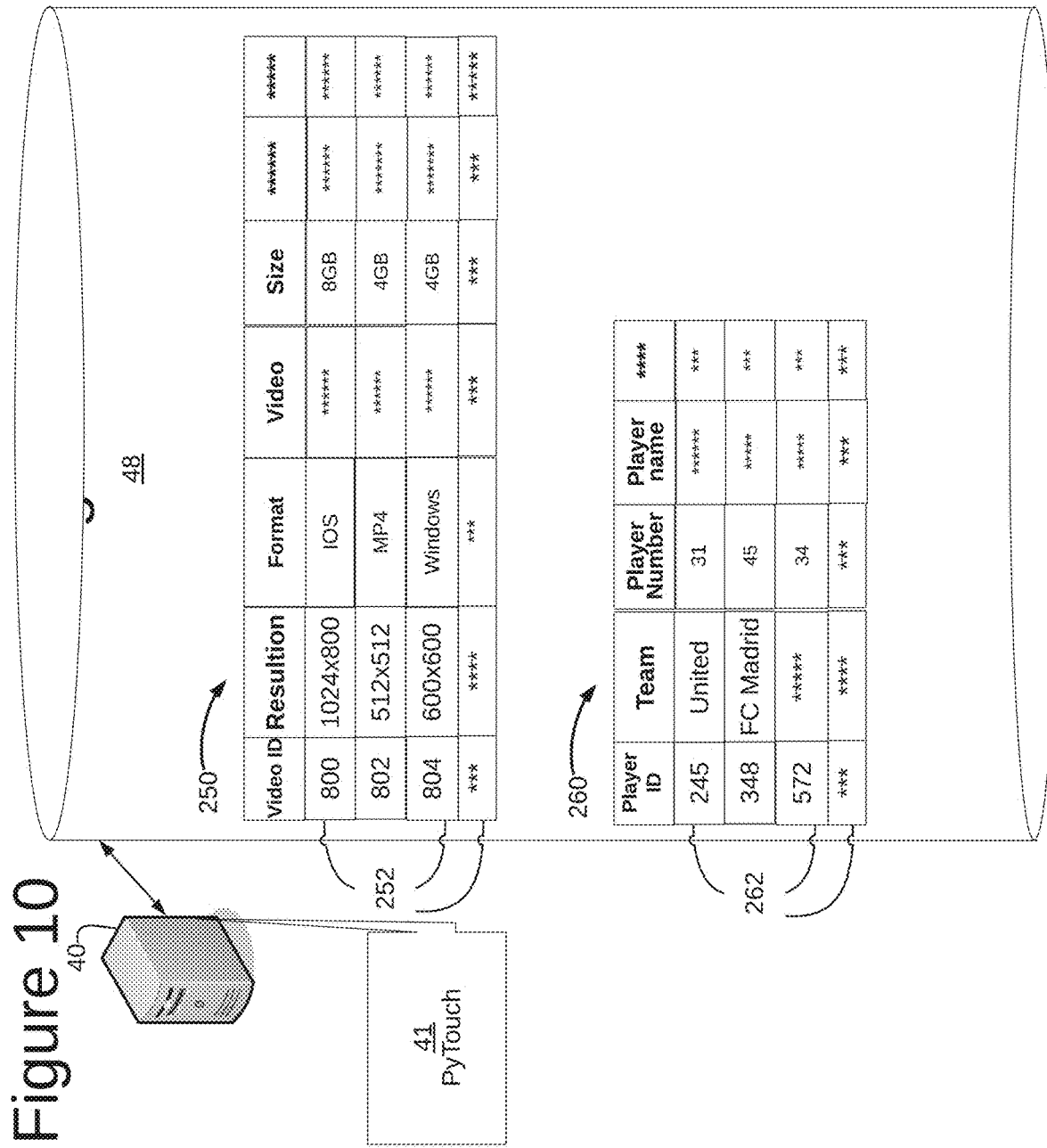
FIG. 10 is a diagrammatic overview of the processor and database system according to one embodiment.

With reference to FIG. 10, an overview of the processor and database system is shown according to one embodiment. The PyTorch system 41 may be implemented to run on a processing system 40 4 TITAN X GPU's with 7 TFlops of single precision, 336.5 GB/s of memory and 12 GB of random access memory (RAM) memory per board.

The database storage 48 may contain multiple tables, including a table for storing recognized player data 260. The records 262 of the player data table 260 may contain, for example, assigned player IDs for indexing, player names, player numbers, teams, images, and analytics.

A video storage table 250 may store records 252 that contain the videos and video information being analyzed, including, for example, fields for the resolution of the videos, images, formats, size, and the like.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A system for automatically generating visual analytics for players in a sport, comprising:
   a processor;
   a storage device for storing a dataset of a plurality of videos of the players playing the sport, the players being divided into two or more teams;
   a set of executable instructions executable on the processor configured to localize and track the players from the videos and identify each of the players;
   an input module for receiving input of the plurality videos for processing each video in a region-of-interest (ROI), having x random players, x being an integer equal to or greater than 1, wherein each ROI is cropped for each team to use as a reference template, wherein each player is cropped to produce a histogram that is computed to be compared with each of the templates to determine the team of the player; and
   a deep convolutional generative adversarial network configured to determine which of the identified players control a ball, including by use of a low-pass filter to smooth detection of transition between players controlling the ball, and generate visual analytics describing the players that control the ball to generate performance statistics for each player controlling the ball, and detect if said identified player who is controlling the ball changes over successive frames, and determine if a new player is detected as controlling the ball, and if the new player belongs to the same team, and if the new player belongs to the same team, define the pass as a successful pass, and otherwise define the pass as a failed pass.

2. The system of claim 1, wherein the performance statistics include a duration time that each player controls the ball.

3. The system of claim 1, further comprising a low-pass filter to smooth transition between different players controlling the ball to reduce misclassification.

4. The system of claim 1, wherein the deep convolutional generative adversarial network further comprises two deep convolutional neural networks, a generator G and a discriminator D trained against each other, wherein the generator takes a random noise vector, z, and returns an image, Xgen=G(z), wherein the discriminator takes a real or a generated image, and outputs a probability distribution P(S|X)=D(X) over two image sources, wherein the discriminator is trained to maximize a log-likelihood of assigning a correct source while G tries to minimize it, wherein the optimization function V is given by:

$$\min_G \max_D V(D, G) = \mathbb{E}_{x \sim p_{data}(x)}[\log D(x)] + \mathbb{E}_{x \sim p_z(z)}[\log(1 - D(G(z)))]$$

wherein the two networks converge to a Nash equilibrium so that D is maximally confused and G generates samples that resemble the training data.

5. The system of claim 4, wherein the deep convolutional generative adversarial network is further configured to replace pooling layers with convolutional layers for both the generator and discriminator using batch normalization after convolutional layers, ReLU activation in the generator and Leaky ReLU in the discriminator.

6. The system of claim 5, further comprising a generator and discriminator network to learn to generate images that resemble players with the ball.

7. A method for automatically generating visual analytics for players in a sport, comprising:
   storing a dataset of a plurality of videos of the players playing the sport, the players being divided into two or more teams;
   executing instructions on the processor configured to localize and track the players from the videos and identify each of the players;
   receiving input of the plurality videos;
   processing each video in a region-of-interest (ROI), having x random players, x being an integer equal to or greater than 1, wherein each ROI is cropped for each team to use as a reference template, wherein each player is cropped to produce a histogram that is computed to be compared with each of the templates to determine the team of the player;
   executing a deep convolutional generative adversarial network configured to determine which of the identified players control a ball, including by use of a low-pass filter to smooth detection of transition between players controlling the ball, and generate visual analytics describing the players that control the ball to generate performance statistics for each player controlling the ball, and detect if said identified player who is controlling the ball changes over successive frames, and determine if a new player is detected as controlling the ball, and if the new player belongs to the same team, and if the new player belongs to the same team, define the pass as a successful pass, and otherwise define the pass as a failed pass.

8. The method of claim 7, wherein the performance statistics include a duration time that each player controls the ball.

9. The method of claim 7, further comprising using a low-pass filter to smooth transition between different players controlling the ball to reduce misclassification.

10. The system of claim 7, wherein the deep convolutional generative adversarial network further comprises two deep convolutional neural networks, a generator G and a discriminator D trained against each other, wherein the generator takes a random noise vector, z, and returns an image, Xgen=G(z), wherein the discriminator takes a real or a generated image, and outputs a probability distribution P(S|X)=D(X) over two image sources, wherein the discriminator is trained to maximize a log-likelihood of assigning a correct source while G tries to minimize it, wherein the optimization function V is given by:

$$\min_G \max_D V(D, G) = \mathbb{E}_{x \sim p_{data}(x)}[\log D(x)] + \mathbb{E}_{x \sim p_z(z)}[\log(1 - D(G(z)))]$$

wherein the two networks converge to a Nash equilibrium so that D is maximally confused and G generates samples that resemble the training data.

11. The method of claim 10, wherein the deep convolutional generative adversarial network is further configured to replace pooling layers with convolutional layers for both the generator and discriminator using batch normalization after convolutional layers, ReLU activation in the generator and Leaky ReLU in the discriminator.

12. The method of claim 11, further comprising using a generator and discriminator network to learn to generate images that resemble players with the ball.

* * * * *